United States Patent

Davis et al.

[11] 4,175,799
[45] Nov. 27, 1979

[54] HYDRODYNAMIC BEARING HAVING ANTICAVITATION RECESSES

[75] Inventors: Billy J. Davis, East Peoria; Cletus M. Kinsey; Hwa J. Shen, both of Peoria; James R. Weber, Chillicothe, all of Ill.

[73] Assignee: Caterpillar Tractor Co., Peoria, Ill.

[21] Appl. No.: 909,754

[22] Filed: May 26, 1978

[51] Int. Cl.² ............................................. F16C 9/02
[52] U.S. Cl. ........................................ 308/9; 308/23; 308/122; 308/240
[58] Field of Search .................. 308/9, 121, 122, 240, 308/23, 167; 74/605, 580, 579

[56] References Cited

U.S. PATENT DOCUMENTS

| | | | |
|---|---|---|---|
| 2,631,905 | 3/1953 | Coppen | 308/240 |
| 2,901,297 | 8/1959 | Sternlicht | 308/121 |
| 2,916,333 | 12/1959 | Johnson | 308/122 |
| 2,940,802 | 6/1960 | Love | 308/122 |
| 3,287,072 | 11/1966 | Buske | 308/122 |
| 3,449,028 | 6/1969 | DeHart | 308/240 X |
| 3,495,685 | 2/1970 | Van Rinsum | 308/240 X |
| 3,625,580 | 12/1971 | DeHart | 308/240 |
| 3,801,173 | 4/1974 | McKindree | 308/240 |

OTHER PUBLICATIONS

Article in Tribology, Aug. 1975, International entitled "Erosion Damage in Engine Bearings" by R. D. James, pp. 161-170.
Article from Leeds-Lyon, Sep. 1974, Symposium on Tribology entitled "Cavitation and Related Phenomena in Lubrication" edited by D. Dawson et al., p. 214.

Primary Examiner—Douglas C. Butler
Attorney, Agent, or Firm—Charles E. Lanchantin, Jr.

[57] ABSTRACT

A hydrodynamic bearing constructed for withstanding varying radial loads has first and second bearing halves arranged on a central axis and encircling a shaft member, each half having an inner bearing face, first and second ends, and first and second sides. A slot of specific construction is formed in the bearing face of at least one of the bearing halves providing a fluid trap for reducing cavitation erosion during use.

8 Claims, 4 Drawing Figures

HYDRODYNAMIC BEARING HAVING ANTICAVITATION RECESSES

BACKGROUND OF THE INVENTION

In the use of hydrodynamic bearings which are subjected to varying radial loads, for example the crankshaft bearing of a diesel engine, the forces of varying magnitude and direction subjected upon the lubricating fluid on the inner face of the bearing causes rapid changes in the pressure of the fluid and the formation of vapor bubbles when the pressure falls below vapor pressure. Upon restoration of a high pressure, these bubbles collapse violently to cause what is known in the art as cavitation erosion of the bearing face.

Cavitation erosion can sometimes be extremely severe and, even under the best conditions, functions to reduce the life of the bearing to a less than desirable value.

Various constructions have been devised for reducing cavitation erosion to a more acceptable value. One scheme, for example, utilizes a plurality of tapered pockets in the bearing face with pressurized oil passages in the bearing leading to the pockets. But, it is often expensive or impractical to route a pressurized fluid to these pockets. Also, it has been found that the circumferentially blended edges of these pockets often deteriorate through cavitation erosion. Another problem resides in the fact that some of the prior art pockets have been so constructed at the ends of the bearing halves that load carrying capacity is lost when the bearing halves are clamped in place by the fastening devices. Still another problem is that excessive bearing surface area has been lost at or adjacent to the pockets so that the service life of the bearing is adversely effected. Although some of these schemes have reduced cavitation erosion, the problem continues to exist at a relatively high level.

SUMMARY OF THE INVENTION

The present invention is directed to overcoming one or more of the problems as set forth above.

According to the present invention, this is accomplished by providing a hydrodynamic bearing having first and second bearing halves encompassing a shaft member in the installed position. Each bearing half has an inner bearing face, first and second ends, and first and second sides. At least one of the bearing faces has a slot or recess of a preselected configuration extending from a respective end a preselected distance along the face to an inner end wall and spaced from each of the sides to form opposite fluid containment barrier ribs. The slot has a bottom, and the inner end wall is substantially parallel to the axis of the bearing and defines a substantially 90° outer edge relative to the bearing face.

DETAILED DESCRIPTION

Figure 1:
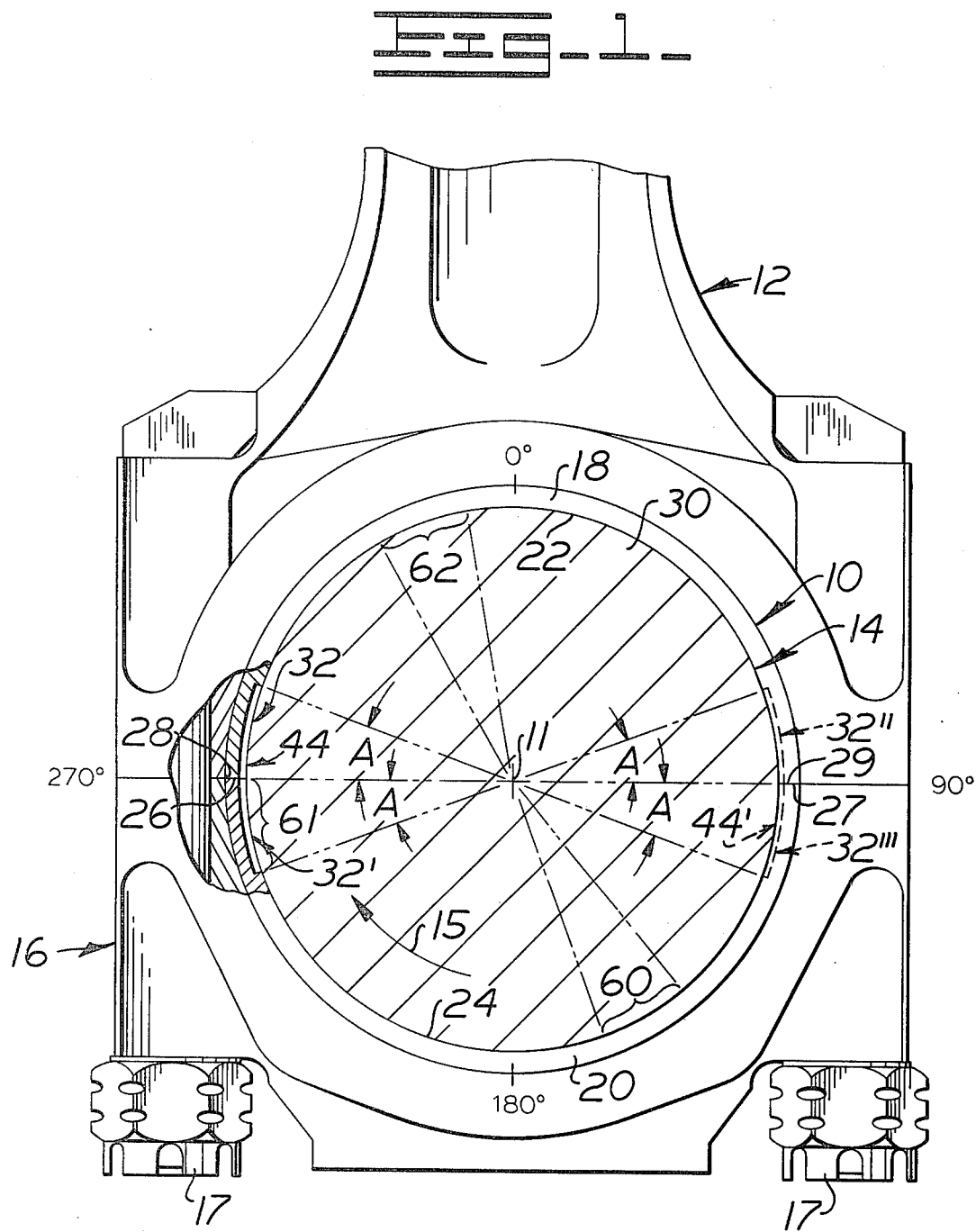
FIG. 1 is a diagrammatic, side elevational view of one embodiment of this invention in the installed position on a connecting rod with a portion broken away to better illustrate details of its construction.

In the illustrated embodiment of the invention shown in FIG. 1, a hydrodynamic bearing 10 has a central axis 11 and is mounted within an engine connecting rod 12. Thus, the bearing 10 experiences relative movement on an engine crankshaft 14 as the crankshaft rotates in the direction of the arrow 15, with the connecting rod having a cap 16 connected thereto by suitable screw threaded fastening devices 17, as is known in the art.

As is further known in the art, the hydrodynamic bearing 10 is formed of top and bottom bearing halves 18 and 20. Each bearing half has a respective inner bearing face 22, 24 and respective first and second ends 26, 27 and 28, 29.

Each of the bearing halves 18 and 20 is of a configuration sufficient for extending about 180° around a substantially cylindrical shaft member 30 of the crankshaft 14 and, in the installed or mating position shown, the respective first ends 26 and 28 of the bearing halves and the respective second ends 27 and 29 contact one another so that the bearing 10 encompasses the shaft member 30.

At least one, and preferably both of the inner bearing faces 22 and 24 of the bearing halves 18 and 20 have either one or two slots or recesses 32 of a preselected configuration extending peripherally from one of the respective ends 26, 27, 28 and 29 thereof. Preferably, at least one of the slots is formed in the bearing half at the point of experienced cavitation erosion. In the instant example, four slots 32, 32', 32" and 32'" of substantially similar construction are utilized with the corresponding portions thereof hereinafter referred to by identical reference numerals bearing the prime indicator of the respective slot. Accordingly, a description of a single one of the slots will suffice for an understanding of the construction of all four of the slots.

Figure 2:
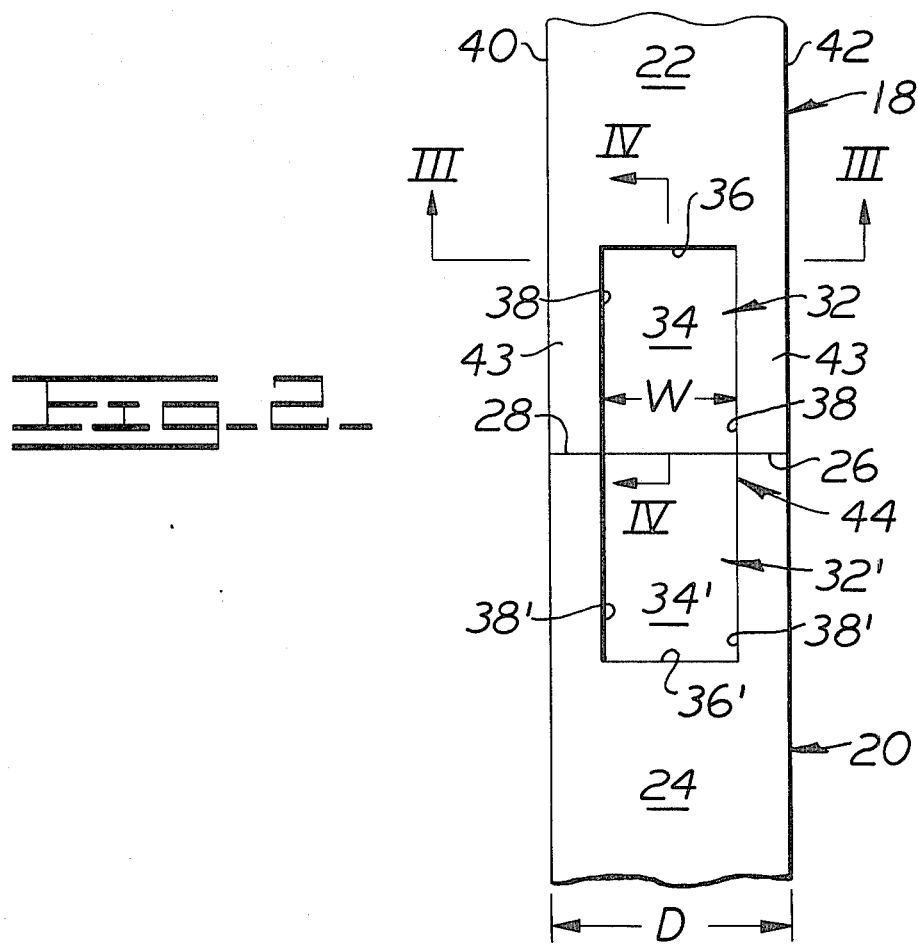
FIG. 2 is a diagrammatic view of the bearing faces and first ends of the mated bearing halves of the bearing illustrated in FIG. 1.
Figure 3:
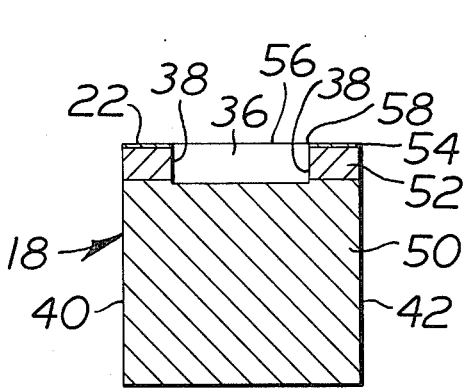
FIG. 3 is a diagrammatic transverse sectional view of a bearing half taken along line III—III of FIG. 2 with the radial dimension exaggerated.
Figure 4:
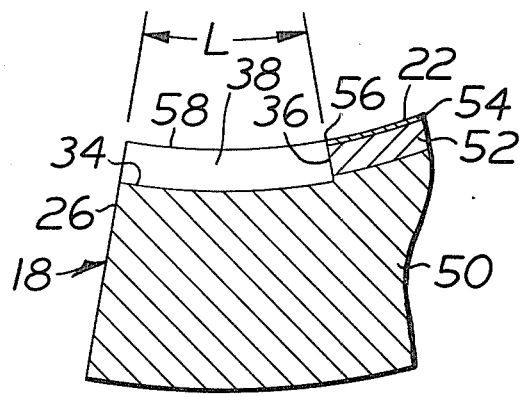
FIG. 4 is a fragmentary, diagrammatic side sectional view of one of the bearing halves as taken along lines IV—IV of FIG. 2 with the radial dimension exaggerated.

Referring now to FIGS. 2, 3 and 4, the slot 32 has a bottom 34 extending from the end 26 inwardly to an uninterrupted inner end wall 36, and also has sidewalls 38 spaced a preselected distance from adjacent sides 40 and 42 of the upper bearing half 18. Thus, the slot is substantially symmetrically centered and serves to define a fluid containment barrier rib 43 at each side thereof and contiguous with the opposite sides 40 and 42 of the bearing 10. The lower slot 32' is substantially a mirror image of the upper slot 32 so that a composite pocket 44 is formed by the two juxtaposed slots. Preferably, each of the peripherally aligned slots has a width "W" between the sidewalls 38 established at a preselected value of between 33% and 75% of the overall distance "D" between the parallel sides 40 and 42 of the bearing halves 18 and 20. The peripheral length "L" of each slot along its respective bearing face 22, 24 is defined by a preselected included angle "A" from the axis 11 of the bearing 10. Preferably, the angle "A" is defined within a range of about 15° to 25°, and preferably 20° as is indicated in FIG. 1, from the respective end 26, 27, 28 or 29.

More particularly, each of the slots 32, 32' preferably has a bottom 34, 34' of uniform depth from the bearing faces 22, 24. Since in the instant embodiment the bearing halves 18 and 20 are of composite material construction as is shown in radially exaggerated diagrammatic form in FIGS. 3 and 4, it has been found desirable to machine out the slots to a uniform depth sufficient to fully penetrate the alloy composition of the bearing faces 22 and 24. Specifically, the bearing halves 18, 20 are formed of a back-up steel bushing 50, and an aluminum bearing 52 thereon with a relatively thin lead-tin overlay 54 on the inner peripheral surface of the aluminum bearing. Accordingly, the slots extend fully through the overlay coating 54 and the aluminum bearing 52 to a depth of about 0.51 mm (0.020″) in order to minimize the possibility of inadvertent flaking off of the alloy composition in use. In the instant example the slot width "W" is 25.4 mm (1.00″), the bearing width "D" is 38.8 mm (1.53″), and the inside diameter of the bearing 10 is 97.8 mm (3.85″).

In accordance with a major aspect of the invention, and as best shown in FIGS. 3 and 4, the inner end wall 36 of the slot 32 is substantially parallel with the axis 11 and has a substantially 90° edge 56 relative to the bearing face 22. Preferably also, the side walls 38 have a substantially 90° edge 58 substantially parallel to the bearing sides 40 and 42 and substantially equally spaced therefrom. The total lubricant containing volume of a single slot 32 as defined by the straight sided walls 36 and 38 and the bottom 34 is preferably established within a range of about 0.008 to 0.03 cm$^3$ per cm of diameter (0.0013 to 0.0050 in$^3$ per in. dia.) of the shaft member 30. Advantageously, the volumetric capacity of the slot forms a self-contained fluid trap which functions to minimize cavitation erosion.

The inventors are not certain exactly how the invention functions to substantially prevent cavitation erosion when one of the slots 32 is formed in a bearing half 18,20 at the point of experienced cavitation erosion. They do have some theories on why the configuration and size of the slots 32 produces desirable highly improved results, but do not wish to be held to the specific theories. They believe that if the edge 56 of the inner end wall 36 of the slot 32 is deviated one way or the other past about 90°, cavitation erosion will increase. This conclusion is supported by unsatisfactory testing of prior art tapered slots with markedly inclined inner end walls, wherein the cavitation erosion point was simply relocated to the bearing face adjacent the end of the pocket or to the inclined bottom of the pocket. Furthermore, if the width "W" of the slot is reduced below about 33% of the overall width D of the bearing 10, cavitation erosion occurs on the bearing faces 22,24 of the barrier ribs 43 adjacent the sidewalls 38. If the slot width is made larger than about 75% of the overall width then the bearing halves 18, 20 are unable to sufficiently withstand the crushing pressure required when the end cap 16 and fastening devices 17 are torqued or loaded during initial assembly of the bearing. Also, if the slot length "L" is less than as set forth above, it is believed that cavitation erosion will increase, and if slot length is greater than above it is believed that there will be an excessive amount of bearing face area lost which would result in a reduced service life of the bearing.

In the operation of the crankshaft 14 in the bearing 10, the axis of the shaft moves in a concentric, and erratic pathway about the axis 11 of the bearing. This is known in the art and such movement results in the undesirable cavitation erosion referred to, particularly where the bearing faces 18, 20 are formed of alloy material as noted above. For example, and as may be noted by reference to FIG. 1, as the crankshaft 14 moves towards the composite pocket 44′, the pressure in the oil in the opposite side of the crankshaft at the composite pocket 44 experiences a reduced pressure. This pressure can be sufficiently great to drop the pressure to a value less than the vapor pressure of the oil. As the oil pressure is reduced to the vapor pressure, the liquid boils at ambient temperature and generates vapor-filled cavities or bubbles which may subsequently collapse and cause cavitation damage upon being repressurized by further relative motion between the crankshaft and the bearing, particularly upon the return movement of the crankshaft towards the pocket 44.

In one theory of the inventors, the collapsing oil bubbles cause high velocity oil micro-streams to be accelerated into the void. These high velocity micro-streams cause minute particles of the alloy facing material of the bearings to be worn away and to cause what is termed cavitation erosion.

In one particular engine arrangement with a prior art bearing, cavitation erosion was experienced at three locations around the periphery of the bearing; namely at one location between 140° and 160° as indicated by the reference numeral 60, at a second most significant problem location between 250° and 270° as indicated by the reference numeral 61, and at a third location between 330° and 350° as indicated by the reference numeral 62 in FIG. 1. However, with the hydrodynamic bearing 10, cavitation erosion at these locations was substantially eliminated.

In some instances a single substantially rectangular slot 32 was found to be sufficient to reduce cavitation erosion, although it is preferred that the slots be used in opposed pairs to form at least one, and preferably two composite pockets 44 symmetrically spaced on the parting line of the bearing halves 18 and 20. In another test of a top bearing half 18 without any slot 32 and a lower bearing half 20 with slots 32′ and 32′″ at the opposite ends, cavitation erosion was substantially eliminated in the lower bearing half, but not the upper bearing half. However, adding slots 32 and 32″ to the upper bearing half minimizes upper bearing half erosion. It is believed that the slots 32, 32′, 32″ and 32′″ are located at the maximum cavitational stress positions, and the relatively large volumetric fluid capacity of the slots and the 90° edges of the walls 36 and 38 cause bubbles which may be wiped to the slot by the shaft movement to experience collapsing immediately adjacent the slot where the preselected trapped or contained oil volume functions to dampen the resultant fluid surges. Irrespective of the theory of operation or function of the apparatus, the subject invention, through testing, has proven to decrease cavitation erosion.

Other aspects, objects and advantages will become apparent from a study of the specification, drawings and appended claims.

The embodiments of the invention in which an exclusive property or privilege is claimed are defined as follows:

1. In a hydrodynamic bearing (10) having an axis (11), first and second bearing halves (18,20), each half (18,20) having a bearing face (22,24), first and second ends (26,27) (28,29), first and second sides (40,42) and extending about 180° around a shaft member (30) with the first and second respective ends (26,28) (27,29) contacting, the improvement comprising:

a slot (32) having a bottom surface (34), a pair of substantially parallel sidewalls (38), and an uninterrupted inner end wall (36) connected between the sidewalls (38), the slot (32) being formed in at least one of said bearing faces (22,24) and extending from a respective end (26,27,28,29) a preselected peripheral distance (L) along the bearing face (22/24) to the inner end wall (36) and being spaced from each of the sides (40,42) to form opposite fluid containment barrier ribs (43) and a fluid trap of preselected volumetric capacity, said inner end wall (36) being substantially parallel to the axis (11) and defining a substantially 90° outer edge (56) relative to the bearing face (22/24), and said bottom surface (34) being of substantially uniform depth from the bearing face (22/24).

2. The bearing (10) of claim 1 wherein said sidewalls (38) define a preselected width "W" of the slot (32), the preselected width being between 33 and 75% of the overall width "D" between said sides (40,42).

3. The bearing (10) of claim 2, wherein said slot (32) extends a preselected peripheral length "L" along the bearing face (22,24), said preselected peripheral length being defined by an included angle "A" from the axis (11) of the bearing (10) of about 15° to 25°.

4. The bearing (10) of claim 1 wherein said slot (32) has a total volumetric capacity in the range of about 0.008 to 0.03 cm$^3$ per cm of diameter of said shaft member (30).

5. The bearing (10) of claim 1, wherein there are a plurality of slots (32,32'), the end walls (36,36') and the sidewalls (38,38') thereof having 90° edges (56,58) relative to the bearing faces (22,24), each slot (32,32') extending along the respective bearing face (22,24) from said respective bearing end (26,27,28,29) and having substantially the same fluid volumetric capacity.

6. The bearing (10) of claim 1, wherein the bearing (10) has at least one composite slot (44) formed by one of said slots (32) in the first bearing half (18) mating with one of said slots (32') in the second bearing half (20).

7. The bearing (10) of claim 1, wherein said slot (32) extends a preselected peripheral length "L" along the bearing face (22,24), said preselected peripheral length being defined by an included angle "A" from the axis (11) of the bearing (10) of about 15° to 25°.

8. The bearing (10) of claim 1, wherein said slot (32) is formed in said first bearing half (18) at said first end (26), and said first bearing half (18) includes another slot (32") similar to said slot (32) at said second end (27).

* * * * *